United States Patent
Döttling et al.

(10) Patent No.: US 7,640,486 B2
(45) Date of Patent: Dec. 29, 2009

(54) METHOD FOR RATE MATCHING

(75) Inventors: Martin Döttling, Neubiberg (DE);
Bernhard Raaf, Neuried (DE); Ralf Wiedmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 855 days.

(21) Appl. No.: 10/504,946

(22) PCT Filed: Feb. 14, 2003

(86) PCT No.: PCT/EP03/01500

§ 371 (c)(1),
(2), (4) Date: Dec. 13, 2004

(87) PCT Pub. No.: WO03/069822

PCT Pub. Date: Aug. 21, 2003

(65) Prior Publication Data

US 2005/0100085 A1    May 12, 2005

(30) Foreign Application Priority Data

Feb. 15, 2002 (EP) .................................. 02003552
Feb. 27, 2002 (EP) .................................. 02004540
Apr. 5, 2002 (EP) .................................. 02007764
May 6, 2002 (EP) .................................. 02010066

(51) Int. Cl.
*H03M 13/00*    (2006.01)

(52) U.S. Cl. .................... 714/790; 714/751; 714/755

(58) Field of Classification Search .............. 714/790, 714/751, 786, 755, 774; 370/338
See application file for complete search history.

(56) References Cited

U.S. PATENT DOCUMENTS

| 7,000,173 | B2 * | 2/2006 | Buckley et al. ............. 714/790 |
| 7,372,837 | B2 * | 5/2008 | Kinjo et al. ................. 370/338 |
| 2002/0006138 | A1 | 1/2002 | Odenwalder | |

FOREIGN PATENT DOCUMENTS

EP    1 176 725    1/2002
WO    WO 99/52216    10/1999

OTHER PUBLICATIONS

R1-02-0199, TR 25.858 "High Speed Downlink Packet access", Espoo, Finland, Jan. 2002.
R1-02-0029, Siemens, "Physical Layer Hybrid ARQ Functionality for HSDPA" Espoo, Finland, Jan. 2002.
3GPP TS 25.212 V5.0.0 (Mar. 2003), "Multiplexing and channel coding (FDD) (Release 5)" 3GPP.

* cited by examiner

*Primary Examiner*—Scott T Baderman
*Assistant Examiner*—Fritz Alphonse
(74) *Attorney, Agent, or Firm*—King & Spalding L.L.P.

(57) ABSTRACT

A method is provided for rate matching a number of input bits in a time interval to a fixed number of output bits in the time interval, whereby the input bits consist of a set of at least two different bit classes, each of the classes having a certain number of bits in the time interval, whereby the rate matching is performed in two rate matching stages, whereby the first rate matching stage operates only on a selection out of the set of different bit classes, thus establishing a proportion between the number of bits of the different classes, and the second rate matching stage operates on all bit classes such that the proportion is exactly or approximately maintained after the second rate matching stage and the fixed number of output bits consisting of bits of the different bit classes is achieved.

17 Claims, 2 Drawing Sheets

METHOD FOR RATE MATCHING

CROSS-REFERENCE TO RELATED APPLICATIONS

This application is a U.S. national stage application of International Application No. PCT/EP03/01500 filed Feb. 14, 2003, which designates the United States of America, and claims priority to European Application No. 02003552.3 filed Feb. 15, 2002, European Application No. 02004540.7 filed Feb. 27, 2002, European Application No. 02007764.0 filed Apr. 5,2002, and European Application No. 02010066.5 filed May 6, 2002, the contents of which are hereby incorporated by reference in their entirety.

BACKGROUND OF THE INVENTION

The present invention relates to a rate matching process which is performed in more than one rate matching stage.

Transmission channels in communications systems provide certain data rates for data transfer. This is due to their embedding in a communications system which entails restrictions on the data rate. However, the data rate of an application might differ from the data rate provided by the transmission channel. Therefore, the individual data rates have to be matched at an interface. This will be further detailed using an example in UMTS (Universal Mobile Telecommunications System).

A major aspect of UMTS is to offer enhanced data rates in comparison to previous mobile communications systems. Therefore, a special downlink transmission is currently being established, the so called High Speed Data Access (HSDPA), which uses the HS-DSCH (High Speed Dedicated Downlink Shared Channel) as data channel and the HS-SCCH (HSD-SCH related Shared Control Channel) as related control channel.

The HSDPA data channel is basically an enhancement of the existing UMTS downlink shared channel. HSDPA allows coding of multiplex different users or mobile stations on up to 15 codes with a spreading factor of 16. The primary multiple access, however, is in the time domain, where different users can be scheduled every transmission time interval (TTI), which corresponds to 3 UMTS slots (i.e., 2 ms) so the TTI is a special time window. Also, the number of codes allocated to one user can change from TTI to TTI. Depending on the system load and channel conditions, the base station or Node B adapts modulation and code rate for each user. A certain combination of code rate and modulation is referred to as MCS (Modulation and Coding Scheme) level, which may change every TTI. A certain MCS is selected on the basis of channel condition measurements.

To achieve the high data rates, modulation and coding schemes are used which allow a high information bit rate per code. For channel coding a rate R=1/3 code, a turbo code is typically used.

For channel coding, bits are added to the actual information carrying bits in order to be able to reconstruct the actual information carrying bits in the receiver; also, in the case that during the data transfer alterations occurred. The actual information carrying bits are referred to as systematic bits or load bits, the additional bits used for the protection as parity bits.

The rate of a turbo code denotes the relation between the systematic bits and the total number of bits to be transferred.

In FIG. 1, a fragment of the transport channel coding structure for the HS-DSCH is shown. After channel coding follows the so called Physical Layer Hybrid ARQ (Automatic Repeat Request) functionality, which includes the rate matching functionality which matches the number of bits at the output of the channel (turbo) coder to the total number of bits of the HS-DSCH physical channels.

The Hybrid-ARQ functionality is controlled by the parameter RV (Redundancy Version); i.e., the exact set of bits at the output of the physical-layer Hybrid-ARQ functionality depends on the number of input bits, the number of output bits, and the RV parameter, which itself includes the parameters s and r. The RV parameter s can take the value 0 or 1 to distinguish self-decodable (1) or non self-decodable transmissions (0). For self-decodable transmissions, preference is given to the systematic bits which are identical to the bits input to the turbo decoder. Apparently, if all systematic bits (plus some parity bits) are transmitted, then the packet can be decoded, at least in good enough channel conditions. If not all systematic bits are transmitted, the packet may not be decodable, depending on the exact selection of parity bits. For non-self-decodable transmissions preference is given to the parity bits. These transmissions are, in particular, effective for retransmissions because they contain different bits than the initial transmission and therefore offer good performance when combined with an initial self-decodable transmission. The RV parameter r does not change the relative number of systematic and parity bits, but establishes which set of bits are used within these classes. In this way different retransmissions can be selected, even if s is selected equal.

The physical-layer Hybrid ARQ functionality consists of two rate-matching stages as shown in FIG. 2.

There is a first rate-matching stage where only the parity bits are punctured, if the number of bits after channel coding exceeds the storage capability of the UE. For rate-matching two possibilities exist, either cutting out bits, which is referred to as puncturing, or repeating bits.

The number of output bits does not yet match the number of physical-channel bits available in the HS-DSCH TTI. Instead, the number of output bits matches the available user equipment (UE) soft-buffering capability, information about which is provided by higher layers. Note that, if the number of input bits does not exceed the UE soft-buffering capability, the first rate-matching stage is transparent. The UE soft-buffering capability is also referred to as the virtual incremental redundancy (IR) buffer.

The second rate-matching stage matches the number of bits at the output of the first rate-matching stage to the number of physical-channel bits available in the HS-DSCH TTI. The second rate-matching stage uses an algorithm for puncturing or repeating bits. The algorithm may use different values for the rate-matching parameters; e.g., the $e_{ini}$ parameter that basically shifts the puncturing pattern. The $e_{ini}$ parameter depends again on the so-called redundancy version or RV parameter; in particular, on r. Different redundancy versions all select the same number of bits of the relevant type, but different bits. This will be explained later in more detail. Depending on the value of the RV parameter, the rate matching algorithm may also be applied differently to a different set of input bits (systematic and parity bits).

The above-described rate-matching can be generally described as adapting the rates of the various input bit streams to the externally fixed rate of the transmission channel. Instead of speaking of a "rate" or "bit stream," the situation can be described in a time window. In that time window a number of bits depending on the respective bit rate will appear. Then, instead of comparing the rates, one can compare the number of bits in the time window.

The above-described approach with the two rate matching stages is currently in discussion. Even if it offers a range of advantages, like simple buffer management in the user terminal or user equipment (UE), simple parameter calculation and reuse of the already existing rate matching algorithm, which is used in the Release 99 version of the UMTS specification in certain cases this type of rate matching becomes disadvantageous. This is especially the case when the UE (user equipment) buffer rate matching punctures due to limited UE soft-buffering capabilities and the channel rate matching stage performs repetition. Repetition occurs in the second stage, when the number of available channel bits within the TTI is higher than the UE virtual IR (incremental redundancy) buffer capability.

However, from the point of view of improving the possibility of a good detection on the receiver side, this is disadvantageous, as investigations have shown.

SUMMARY OF THE INVENTION

Based on the forgoing description it is an object of the present invention to optimize a rate matching process performed in more than one stage such that an improved information content is achieved at the output of the last rate matching stage.

The present invention is directed toward roughly maintaining the proportion between parity bits and systematic bits achieved after the first rate matching stage and also after the last rate matching stage in cases where repetition is performed in the second rate matching stage. The proportion can only be roughly maintained, because only integer number of bits can be repeated in the second rate matching stage. This correspondingly can lead to a slight change of the proportion. However, this change is small as it does correspond only to at most one or two bits. This is based on investigations on the decodability of data transferred via a physical channel. It has been found out that an imbalance of the proportions leads to deterioration of the decodability of the transferred bits. In other words, the repetition rate of the second rate matching step is roughly the same for all bit classes, regardless of the procedures at the first rate matching stage.

Additional features and advantages of the present invention are described in, and will be apparent from, the following Detailed Description of the Invention and the Figures.

DETAILED DESCRIPTION OF THE INVENTION

In the work preparatory to the present invention it has been found out that the conjunction of puncturing in the first stage and repetition in the second stage should, in fact, occur only with more or less low repetition rates in the second stage. Otherwise, a different coding scheme will yield better results and will probably be used. Nevertheless, a combination of puncturing and repetition might also occur due to other reasons related to network status, granularity in available transport block size, etc. Regardless, the second rate matching can be refined, as it is detailed below, beginning with an analysis of the calculation of rate matching parameters for the second stage with reference to FIG. 2. The first rate matching is performed on parity bits, in the shown case on parity 1 and parity 2 bits to account for the limited capacity of the virtual IR buffer (BUF). The following distinction has to be made here:

a) the number of incoming bits is equal to or smaller than the capacity of the virtual IR buffer BUF, with the first rate matching stage (FRS1) being transparent for all bit classes (i.e., systematic and parity bits);

b) the number of incoming bits is greater than the capacity of the virtual IR buffer BUF, with puncturing being performed on the parity bits, wherein after the first rate matching unit, a certain ratio or proportion between systematic bits, parity 1 bits and parity 2 bits is established, and the total number of bits of all classes after the first rate matching unit RMU1 is $N_{sys}+N_{p1}+N_{p2}$.

In the second rate matching stage (RMU2) this number $N_{sys}+N_{p1}+N_{p2}$ has to be matched to the given number of bits $N_{data}$ of the transmission channel.

In the second rate matching stage RMU2, all bits can experience puncturing or repetition, if this is required for the matching. The present invention proposes methods for a puncturing or repeating that conserves the encoded information satisfyingly.

Theoretically, from a performance point of view, it is not reasonable to do first puncturing and after that repetition. But, as explained above, this can occur due to the limitation of UE buffer.

The present invention will be explained now using embodiments with relation to the above-mentioned HSDPA.

Figure 1:
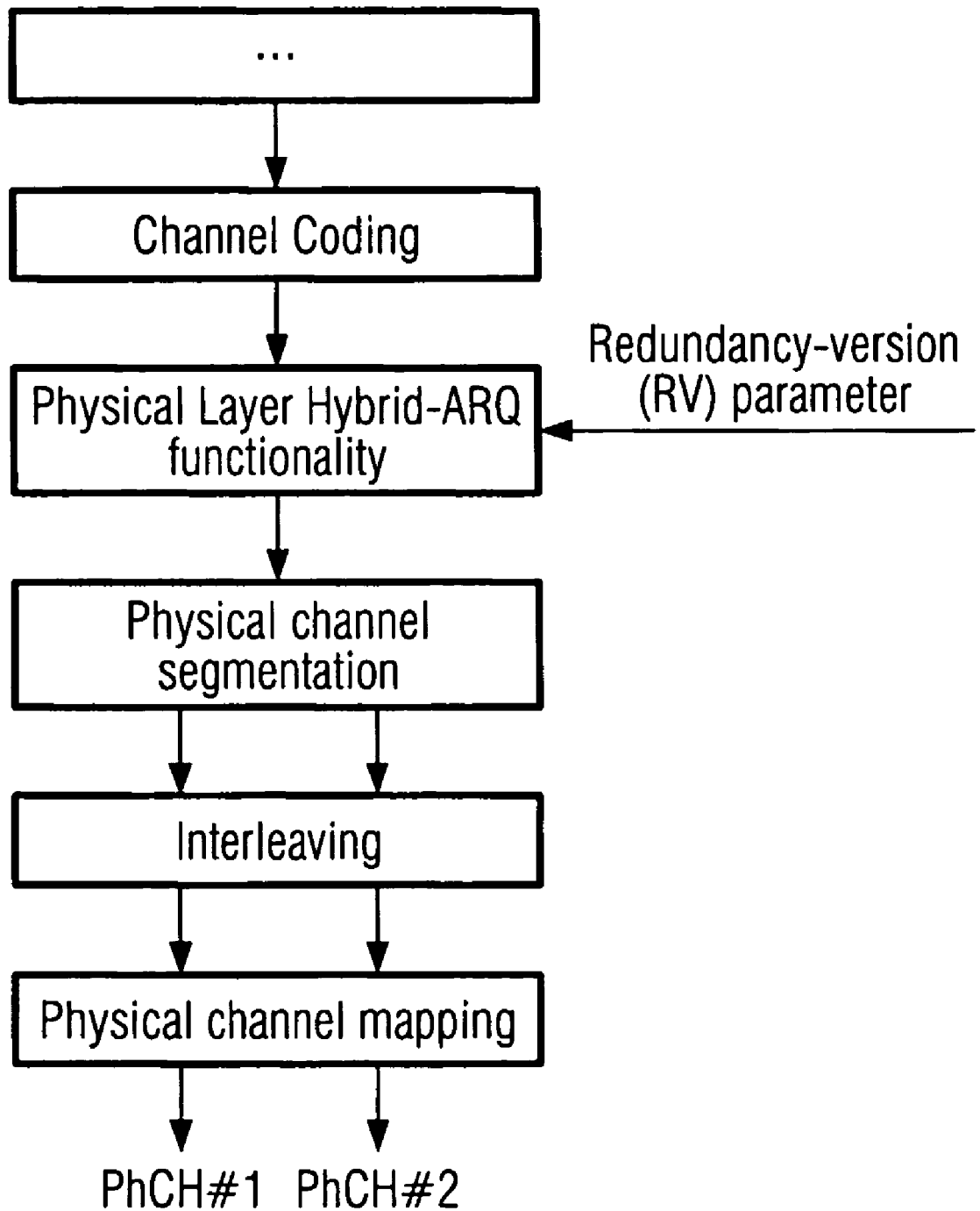
FIG. 1 shows a fragment of the transport channel coding structure for HS-DSCH.

Since for HSDPA puncturing in the first stage is done conformingly to the standard set in R99 (release 99) concerning the puncturing of turbo codes, only the parity bits are punctured and the systematic bits are transparent; i.e., they do not experience puncturing. The proportion of systematic bits to parity 1 and parity 2 bits after the first stage differs from 1:1:1 if puncturing is applied. This is due to the fact that in the first rate matching stage the parity bits experience puncturing, if this is required due to the limited soft buffer capability, whereas the systematic bits do not. However, it was shown in simulations for R99 that not puncturing the systematic bits gives an improved performance. FIG. 1 shows the two step rate matching approach described in [1], which already has been detailed above.

Figure 2:
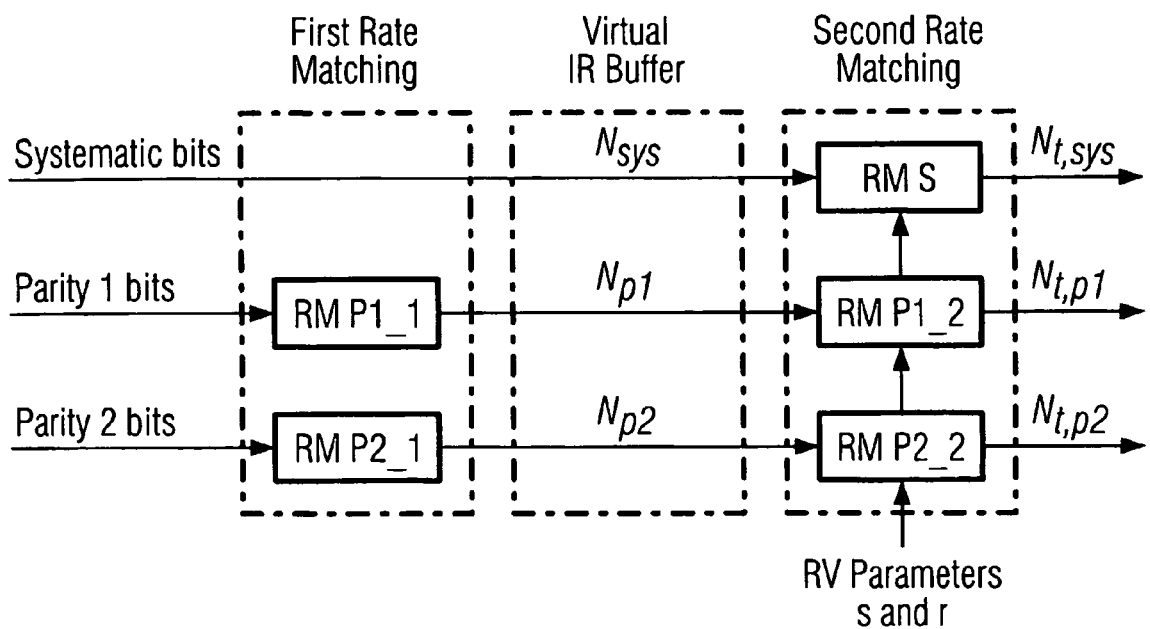
FIG. 2 shows a physical layer hybrid ARQ functionality in the case of HSDPA in UMTS.

In FIG. 2, a two step rate matching (physical layer HARQ functionality) is depicted, wherein the following is denoted.

RM Pi_j: The rate matching at the stage j for the class i of parity bits.

RM S: The rate matching for the class of systematic bits.

$N_k$: Number of respective bits k (systematic or parity bits).

$N_{t,k}$: Number of respective bits k to be transmitted.

Currently, the second rate matching rule, as described in the introduction, is not well-balanced and does not maintain the proportion between systematic and parity bits after first rate matching. The available number of repetition bits are simply subdivided equally to systematic, parity 1 and parity 2 bits. The outcome of this is that the repetition rate is unequal for parity and systematic bits. To avoid this, a method according to the present invention proposes to have approximately equal repetition on all three bit streams of the channel rate matching.

In detail for $N_{data}>N_{sys}+N_{p1}+N_{p2}$, repetition is performed in the second rate matching stage. $N_{data}$ denotes the number of available physical channel bits per TTI. To calculate the amount of repetition for the systematic, parity 1 and parity 2 bits in an embodiment the following formula to calculate the number of systematic bits for transmission is used:

$$N_{t,sys} = \left\lfloor N_{sys} \cdot \frac{N_{data}}{N_{sys} + N_{p1} + N_{p2}} \right\rfloor$$

Further Embodiments of the Present Invention:

a) Parameter of Second Rate Matching Stage (Channel Rate Matching)

The parameters of the second rate matching stage depend on the value of the RV parameter s, which can take the value 0 or 1 to distinguish self-decodable (1) and non-self-decodable (0) transmissions, and the RV parameter r (range 0 to $r_{max}$) which changes the initial error variable $e_{ini}$.

The number of bits are denoted before second rate matching as $N_{sys}$ for the systematic bits, $N_{p1}$ for the parity 1 bits, and $N_{p2}$ for the parity 2 bits, respectively. The number of available physical channel bits per TTI is $N_{data}$. Bit separation is used and the rate matching parameters are determined as follows.

For $N_{data} \leq N_{sys}+N_{p1}+N_{p2}$, puncturing is performed in the second rate matching stage. The number of transmitted systematic bits in a retransmission is $$N_{t,sys} = \min\{N_{sys}, N_{data}\}$$

for a transmission of self-decodable type (s=1) and $$N_{t,sys} = \max\{N_{data}-(N_{p1}+N_{p2}),0\}$$

in the non-self-decodable case, i.e., s=0.

For $N_{data}>N_{sys}+N_{p1}+N_{p2}$ repetition is performed in the second rate matching stage. A similar repetition rate in all bit streams is achieved by setting the number of transmitted systematic bits to $$N_{t,sys} = \left\lfloor N_{sys} \cdot \frac{N_{data}}{N_{sys} + N_{p1} + N_{p2}} \right\rfloor.$$

The available room for parity bits in a transmission is $$N_{t,p1} = \left\lfloor \frac{N_{data} - N_{t,sys}}{2} \right\rfloor \text{ and } N_{t,p2} = \left\lceil \frac{N_{data} - N_{t,sys}}{2} \right\rceil$$

for the parity 1 and parity 2 bits, respectively.

Table 1 summarizes the resulting parameter choice for the second rate matching stage. The parameter a in Table 1 is chosen as in [2]; i.e., a=2 for parity 1 and a=1 for parity 2.

TABLE 1

Parameters for Second Rate Matching Stage in case of puncturing

| | $X_i$ | $e_{plus}$ | $e_{minus}$ |
|---|---|---|---|
| Systematic RM S | $N_{sys}$ | $N_{sys}$ | $|N_{sys} - N_{t,sys}|$ |
| Parity 1 RM P1_2 | $N_{p1}$ | $a \cdot N_{p1}$ | $a \cdot |N_{p1} - N_{t,p1}|$ |
| Parity 2 RM P2_2 | $N_{p2}$ | $a \cdot N_{p2}$ | $a \cdot |N_{p2} - N_{t,p2}|$ |

The rate matching parameter $e_{ini}$ (cf. subclause 4.2.7.5 of [2]) is calculated for each bit stream according to the $e_{ini}$ variation parameter r using $$e_{ini}(r) = \{[X_i - r \cdot e_{minus} - 1] \bmod e_{plus}\} + 1$$

in the case of puncturing (i.e., $N_{data} \leq N_{sys}+N_{p1}+N_{p2}$), and $$e_{ini}(r) = \{[X_i - (2 \cdot s + r) \cdot e_{minus} - 1] \bmod e_{plus}\} + 1$$

for repetition (i.e., $N_{data}>N_{sys}+N_{p1}+N_{p2}$).

Several further embodiments of the present invention can be applied by those versed in the art. For example, rounding signs can be selected to round upwards or downwards or even to the next even integer, again possibly upwards or downwards. In this way, some fine-tuning is possible. As an example, some preferred embodiments are given hereunder.

It may be the case that the first rate matching generates cases where there are some (or exactly one) first parity bits (i.e., $N_{p1}=1$) but no second parity bits (i.e. $N_{p2}=0$). In that case, the formulas presented above would cause repetition of second parity bits, which is impossible as there is no single bit to repeat. While this is an extreme case of parameterization which will probably not be used in a sensibly engineered system, it is still possible to account for this case by a small modification of the formula.

$$N_{t,sys} = \left\lfloor N_{sys} \cdot \frac{N_{data}}{N_{sys} + 2N_{p2}} \right\rfloor.$$

In this way, all the transmitted bits will be allocated for systematic bits, if no single parity 2 bit is present after the second rate matching. Then no parity bits, in particular no parity 2 bits, will need to be repeated, which avoids the problem having to repeat non-existent parity 2 bits. Depending on the particularities of the first rate matching step, the case may happen that no parity 1 bits but one parity 2 bit is present after the first rate matching. Also, the other situation is possible; i.e., that the first rate matching step creates more parity 2 bits than parity 1 bits (if the sum of both parity 1 and parity 2 bits is odd). This is the case for the first rate matching step proposed for UMTS. Then, also, the case that no parity 2 bits but one parity 1 bit is present after the first rate matching will not happen. In this case, the formulas presented above will not be directly applicable, but the principles pointed out also can be applied for the case that there are more parity 2 bits after the first rate matching than parity 1 bits. Basically, in all the formulas presented here, "parity 1" and "parity 2" and the corresponding indices have to be swapped. Therefore the formulas (and the description) to be used for an extension of the UMTS systems are not exactly the formulas shown here, but the ones with "parity 1" and "parity 2" swapped; e.g., the last formula would then be modified to be $$N_{t,sys} = \left\lfloor N_{sys} \cdot \frac{N_{data}}{N_{sys} + 2N_{p1}} \right\rfloor.$$

Similarly, all the other formulas can be modified by swapping parity 1 and parity 2 bits. As this is quite obvious, it will not be highlighted throughout this document but is still considered to be within the scope of the present invention. As a matter of fact, it can be considered to be purely a question of the nomenclature which stream to call parity 1 or parity 2 bits, at least for the purpose of the second rate matching stage.

As a further enhancement, it can be desirable to have more parity 1 bits after second rate matching than parity 2 bits, or the same number. As such, if there is an odd number of bits available for parity bits, then parity 1 bits will be preferred in the sense that $N_{t,p1}=1+N_{t,p2}$. One reason for such a preference is that the same preference is already given for the bits after first rate matching. If the same preference is also given for the second rate matching, then the puncturing or repetition rate for the second rate matching step will be more similar between parity 1 and parity 2 bits than if the preference was inversed.

An other advantage is the ease of implementation of subsequent processing steps after the second rate matching. For example, in another application of the same applicant dated Feb. 19, 2002 and named "An optimization of the bit distribution function for HSDPA," a method is given as to how these bits are further distributed on so-called high and low reliable positions. For this purpose, in one particular processing step, it is proposed to write parity 1 and parity 2 bits alternating. If there is at most 1 more parity 1 bits that parity 2 bits (or an equal number), as proposed by this invention, then it is always possible to write parity 1 and parity 2 bits alternating starting with a parity 1 bit. Otherwise at the end two parity 2 bits may have to be written in succession, which is clearly less preferred and would also complicate the implementation due to having to cope with this exception in some particular cases.

The formula to achieve this preference towards parity 1 bits would simply be to inverse the rounding for calculation, i.e. to calculate the number of parity bits in a transmission as:

$$N_{t,p1} = \left\lceil \frac{N_{data} - N_{t,sys}}{2} \right\rceil \text{ and } N_{t,p2} = \left\lfloor \frac{N_{data} - N_{t,sys}}{2} \right\rfloor$$

for the parity 1 and parity 2 bits, respectively.

Another embodiment achieving the same objective (i.e., to allow an efficient handling of the bits after the second rate matching step) would be to make sure that the number of bits available for parity bits is always even. Assuming that the total number of bits available for transmission is even as well (this is indeed the case for HSDPA, but the argument could be adapted also for the case the total number is odd), the number of systematic bits to be transmitted must also be selected to be even. This can be done by rounding not to the next integer for the calculation of $N_{t,sys}$, the number of transmitted systematic bits, but by rounding to an even integer. Again, rounding can be performed upwards or downwards or to the nearest even integer, in the latter case again rounding can be done upwards or downwards if the result before rounding would be an odd integer or in that special case rounding can be done to the nearest integer divisible by 4.

The formulas then, for example, could be written as follows.

For $N_{data} \leq N_{sys}+N_{p1}+N_{p2}$, puncturing is performed in the second rate matching stage. The number of transmitted systematic bits in a retransmission is $N_{t,sys}=\min\{2*\lfloor N_{sys}/2 \rfloor, N_{data}\}$ for a transmission of self-decodable type and $N_{t,sys}=\max\{2*\lfloor (N_{data}-(N_{p1}+N_{p2}))/2 \rfloor, 0\}$ in the non-self-decodable case.

For $N_{data}>N_{sys}+N_{p1}+N_{p2}$, repetition is performed in the second rate matching stage. A similar repetition rate in all bit streams is achieved by setting the number of transmitted systematic bits to $$N_{t,sys} = 2 * \left\lfloor N_{sys} \cdot \frac{N_{data}}{2N_{sys}+4N_{p2}} \right\rfloor.$$

The number of parity bits in a transmission is $$N_{t,p1} = \frac{N_{data} - N_{t,sys}}{2} \text{ and } N_{t,p2} = \frac{N_{data} - N_{t,sys}}{2}$$

for the parity 1 and parity 2 bits, respectively. Note that in this case no rounding is necessary for the calculation of $N_{t,p1}$ and $N_{t,p1}$ because both values will be integers.

As a further aspect of the present invention, the exact way how to generate different redundancy versions can be enhanced. Different redundancy versions all select the same number of bits of the relevant type, but different bits. Ideally, regarding two redundancy versions:

1) differ in as many as possible bits; i.e., there should be as few bits that are punctured in one redundancy version and also in another one as possible.

2) Further, a reasonable number of redundancy versions should be selected. Due to constraints in the signalling, this number may typically be selected to be 2 or 4.

3) As a further optimization, the bit patterns that are punctured in two redundancy versions should be well seperated from another. As such, if one redundancy version punctures bits number 1,9,17, . . . , another redundancy version should puncture bits 5,13,21, . . . and not bits 2,10,18. The latter pattern is only shifted by one against the first one, while the second is shifted by 4. In this way, after a combination of two transmissions, the punctured bits of both transmissions are more evenly distributed using the second pattern than when using the third pattern (together with the first one). Similarly, if only bits number 1,9,17, . . . are not punctured in one redundancy version, then in the next redundancy version ideally bits number 5,13,21, . . . should not be punctured.

The generation of different puncturing patterns is achieved by setting the parameter $e_{ini}$ depending on the parameter r. The same principles also apply if repetition is done, in this case $e_{ini}$ is calculated depending on (2s+r). Both cases are similar, wherein sometimes only puncturing will be dealt with in the following text to simplify the notation, but it should be highlighted that the present invention is equally applicable for repetition as well.

The formulas from above for the calculation of $e_{ini}$ are printed here again $$e_{ini}(r) = \{[X_i - r \cdot e_{minus} - 1] \bmod e_{plus}\} + 1$$

in the case of puncturing (i.e., $N_{data} \leq N_{sys}+N_{p1}+N_{p2}$), and $$e_{ini}(r) = \{[X_i - (2 \cdot s + r) \cdot e_{minus} - 1] \bmod e_{plus}\} + 1$$

for repetition (i.e., $N_{data}>N_{sys}+N_{p1}+N_{p2}$).

The variable $e_{ini}$ is used as a starting value for the error variable e of the rate matching algorithm that is used to actually determine which bits to puncture. This algorithm is described in section 4.2.7.5 "Rate matching pattern determination" of [3]. This section is cited here.

b) Rate Matching Pattern Determination

The bits before rate matching are densted by:

$x_{i1}, x_{i2}, x_{i3}, \ldots, x_{iX_i}$, where i is the TrCH number and the sequence is defined in 4.2.7.3 for uplink or in 4.2.7.4 for downlink. Parameters $X_i$, $e_{ini}$, $e_{plus}$, and $e_{minus}$ are given in 4.2.7.1 for uplink or in 4.2.7.2 for downlink.

The rate matching rule is as follows:

```
if puncturing is to be performed
    e = e_ini              initial error between current and
                           desired puncturing
ratio
    m = 1                  index of current bit
    do while m <= X_i
        e = e - e_minus    update error
        if e <= 0 then     check if bit number m should be
                           punctured
            set bit x_{i,m} to δ where δ ∉ {0, 1}
            e = e + e_plus update error
        end if
        m = m + 1          next bit
    end do
else
    e = e_ini              initial error between current and
                           desired
puncturing ratio
    m = 1                  index of current bit
    do while m <= X_i
        e = e - e_minus    update error
        do while e <= 0    check if bit number m should be
                           repeated
            repeat bit x_{i,m}
            e = e + e_plus update error
        end do
        m = m + 1          next bit
    end do
end if
A repeated bit is placed directly after the original one.
End of citation
```

Note that a bit that is set to δ is actually punctured because the δ are removed.

As can be seen by inspecting the formulas, if $e_{ini}$ is increased by a value of $e_{minus}$, then the puncturing pattern is shifted by one bit, if $e_{ini}$ is increased by a sh*$e_{minus}$, where sh is an integer, than the puncturing pattern is shifted by sh bits. If $e_{ini}$ is incremented by a value smaller than $e_{minus}$, then some puncturing positions (positions where a bit is punctured) may be shifted by one and others may be not affected, this depends on the exact values of the other parameters.

Apparently the formula for the setting of $e_{ini}$ as presented above is only good with respect to the criteria 1 and 2 above, but not with respect to criterion 3. Therefore, another scheme for setting $e_{ini}$ is also known, which is better with respect to criterion 3:

$$e_{ini}(r) = \{\lfloor X_i - (r \cdot e_{plus}/r_{max}) - 1 \rfloor \bmod e_{plus}\} + 1 \text{ in the case of puncturing, and}$$

$$e_{ini}(r) = \{\lfloor X_i - ((s+2 \cdot r) \cdot e_{plus}/(2 \cdot r_{max})) - 1 \rfloor \bmod e_{plus}\} + 1 \text{ for repetition.}$$

Where $r \in \{0, 1, \ldots, r_{max}-1\}$ and $r_{max}$ is the total number of redundancy versions allowed by varying r, which was already said to be typically 2 or 4.

In this way, $e_{ini}$ is varied not in steps of $e_{minus}$ but in steps of $e_{plus}/r_{max}$. Note that due to the modulo calculation included in the formula which is necessary because $e_{ini}$ can reasonably only take values between 1 and $e_{plus}$, a variation that exceeds $e_{plus}$ is equivalent to a smaller variation. Therefore, this formula tries to maximize the variation of $e_{ini}$ within the reasonable range and consequently better fulfils criterion 3. Therefore, this formula is used for HSDPA as specified in [3].

However, it is still possible to enhance this formula for $e_{ini}$. One crucial fact is that the formula above also can cause non integer values for $e_{ini}$, if $e_{plus}*r$ is not divisible by $r_{max}$ (or (s+2*r) is not divisible by 2*$r_{max}$ in the case of repetition). This is an unnecessary complication of the implementation for the rate matching formula in section 4.2.7.5. Therefore, an objective of the present invention is to simplify the implementation by providing an alternative that does not involve this disadvantage.

There is also another reason to modify the formula for some special cases; i.e., if the system uses some specific parameters e.g.

A single bit needs to be punctured ($N_{p1}=1$; $N_{t,p1}=0$). The parameters that would be calculated without rounding are $X_i=1$, $e_{plus}=1$, $e_{minus}=1$, $e_{ini}=1.5$. Then the rate matching algorithm would not puncture this single bit, which is contradictory to the requirement that this bit should be punctured. $e_{ini}$ has to be at most 1 so that this single bit is punctured. Generally, to puncture (or repeat) all bits the following condition must apply: $e_{plus}=e_{minus}$ AND $e_{ini}<=e_{plus}$. This is not achieved with the present formula. The same applies to repetition of a single bit ($N_{p1}=1$; $N_{t,p1}=2$). Here the formula also fails.

In general, the condition $e_{ini}<=e_{plus}$ is necessary to make sure that the correct number of bits are punctured. Due to the fact that $e_{ini}$ may not be an integer, this prerequisite cannot be assured (while the prerequisite is assured for integer values due to the mod function).

All these problems are solved by rounding the fraction which is calculated:

$$e_{ini}(r) = \{\lfloor X_i - (r \cdot e_{plus}/r_{max}) - 1 \rfloor \bmod e_{plus}\} + 1 \text{ in the case of puncturing, and}$$

$$e_{ini}(r) = \{\lfloor X_i - ((s+2 \cdot r) \cdot e_{plus}/(2 \cdot r_{max})) - 1 \rfloor \bmod e_{plus}\} + 1 \text{ for repetition.}$$

Note that the symbol $\lfloor \ \rfloor$ is used to denote rounding towards minus infinity, also sometimes called floor( ).

These formulas are equivalent to performing the rounding outside of the modulo operation (or actually anywhere where it covers the division that can cause fractional numbers to appear), e.g.:

$$e_{ini}(r) = \lfloor (X_i - (r \cdot e_{plus}/r_{max}) - 1) \bmod e_{plus} \rfloor + 1 \text{ in the case of puncturing, and}$$

$$e_{ini}(r) = \lfloor (X_i - ((s+2 \cdot r) \cdot e_{plus}/(2 \cdot r_{max})) - 1) \bmod e_{plus} \rfloor + 1 \text{ for repetition.}$$

Implementing the rounding function directly after the division minimizes the area where fractional figures have to be dealt with:

$$e_{ini}(r) = [(X_i - \lfloor r \cdot e_{plus}/r_{max} \rfloor - 1) \bmod e_{plus}] 1 \text{ in the case of puncturing, and}$$

$$e_{ini}(r) = (X_i - \lfloor (s+2 \cdot r) \cdot e_{plus}/(2 \cdot r_{max}) \rfloor - 1) \bmod e_{plus} + 1 \text{ for repetition.}$$

This minimizing of the area where fractional numbers are used can also be applied for the other preferred embodiments.

In a further variant, the division followed by rounding can also be implemented as a so-called integer division, often denoted by the symbol "div." This is equivalent to a division yielding a fractional result which is then rounded downwards, at least for positive figures, which is the case here. The div function can be efficiently implemented, for example, in digital signal processors, where it is often available as a machine instruction. The formulas would then read:

$e_{ini}(r) = [(X_i - (r \cdot e_{plus}) \text{div } r_{max} - 1) \text{ mod } e_{plus}] + 1$ in the case of puncturing, and $e_{ini}(r) = (X_i - ((s + 2 \cdot r) \cdot e_{plus}) \text{div}(2 \cdot r_{max}) - 1) \text{ mod } e_{plus} + 1$ for repetition.

Note that instead of rounding downwards, rounding upwards also can be implemented. This may cause a shift of one position for some punctured bits, but this difference typically will not be crucial. Rounding upwards is slightly more complex from an implementation point of view, as the div function cannot be used. Typically one would have to add the dividend minus one before performing the div operation. However, rounding upwards denoted by the symbol $\lceil \ \rceil$ can only be performed inside the modulo function, otherwise again the same problem as identified above would occur i.e. the single bit would not be punctured, because $e_{ini}$ would be calculated to be 2 (after rounding from 1.5) and therefore would be larger than $e_{plus}$. Rounding inside the modulo function would give the following formula:

$e_{ini}(r) = \{(X_i - \lceil r \cdot e_{plus}/r_{max} \rceil - 1) \text{ mod } e_{plus}\} + 1$ in the case of puncturing, and $e_{ini}(r) = \{(X_i - \lceil (s + 2 \cdot r) \cdot e_{plus}/(2 \cdot r_{max}) \rceil - 1) \text{ mod } e_{plus}\} + 1$ for repetition.

With any of these preferred embodiments it is possible to generate redundancy versions consistently that always puncture or repeat exactly the required number of bits.

Generally, the present invention in its various embodiments focuses on

1. Rate matching scheme,
    using at least two rate matching steps operating serially on multiple classes of elements,
    whereby in a first rate matching step the puncturing or repetition rate is different for different classes,
    whereby the repetition or puncturing rate of a second rate matching step is identical or almost identical for the different classes.
2. A rate matching scheme as described in 1, where a preference is given to a first class compared to a second class by rounding upwards for the calculation of the number of elements to be transmitted after the second rate matching step for the first class and downwards for the second class.
3. A rate matching scheme, allowing creation of different redundancy versions by pre-setting or predetermining an initial error variable $e_{ini}$ which is used in the rate matching algorithm with different values.
4. A rate matching scheme as described in 1 to 3, where $e_{ini}$ is calculated as the sum of an initial error variable plus the integer fraction of $e_{plus}$ divided by the number of the redundancy versions, where $e_{plus}$ is the increment of the error variable which is used after each puncturing operation.

Figure 3:
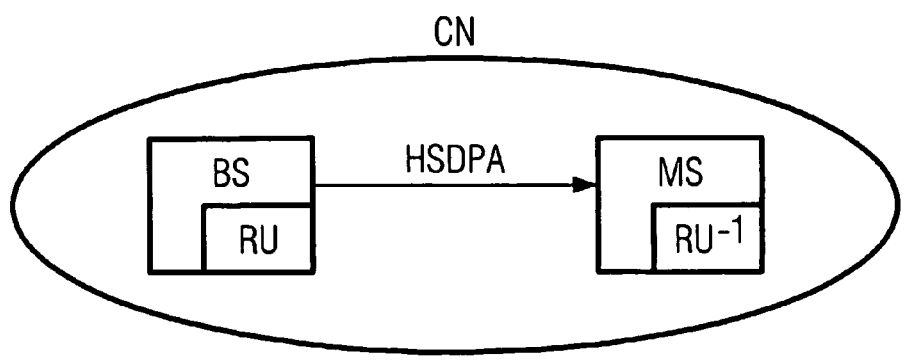
FIG. 3 shows schematically an embodiment of the data transfer via HSDPA in a communications network between a base station and a mobile station, where the rate matching takes place in the base station and the respective undoing takes place in the mobile station or user equipment.

The rate matching takes place in a base station BS in a rate matching unit RU. A base station is a central unit in a communications network CN that serves, for example, a cell in a cellular network. The complementary undoing of the rate matching takes place in the terminal or mobile communications device in a unit $RU^{-1}$. This is schematically depicted in FIG. 3, where the HSDPA Data transfer is suggested by the arrow.

Although the present invention has been described with reference to specific embodiments, those of skill in the art will recognize that changes may be made thereto without departing from the spirit and scope of the present invention as set forth in the hereafter appended claims.

REFERENCES

[1] R1-02-0199, TR 25.858 "High Speed Downlink Packet access", Espoo, Finland, January, 2002
[2] R1-01-0029, Siemens, "Physical Layer Hybrid ARQ Functionality for HSDPA", Espoo, Finland, January, 2002
[3] 3GPP TS 25.212 V5.0.0 (2002-03), "Multiplexing and channel coding (FDD) (Release 5)", 3GPP

LIST OF ABBREVIATIONS

ARQ Automatic Repeat Request
BCH Broadcast Channel
BER Bit Error Rate
BLER Block Error Rate
BS Base Station
CCPCH Common Control Physical Channel
CCTrCH Coded Composite Transport Channel
CFN Connection Frame Number
CRC Cyclic Redundancy Check
DCH Dedicated Channel
DL Downlink (Forward link)
DPCCH Dedicated Physical Control Channel
DPCH Dedicated Physical Channel
DPDCH Dedicated Physical Data Channel
DS-CDMA Direct-Sequence Code Division Multiple Access
DSCH Downlink Shared Channel
DTX Discontinuous Transmission
FACH Forward Access Channel
FDD Frequency Division Duplex
FER Frame Error Rate
GF Galois Field
HARQ Hybrid Automatic Repeat reQuest
HS-DPCCH A Dedicated Physical Control Channel associated with high speed
downlink transmission.
HS-DSCH High Speed Downlink Shared Channel
HS-PDSCH High Speed Physical Downlink Shared Channel
HS-SCCH Shared Control Channel for High Speed Downlink Shared Chanel
MAC Medium Access Control
Mcps Mega Chip Per Second
MS Mobile Station
OVSF Orthogonal Variable Spreading Factor (codes)
PCCC Parallel Concatenated Convolutional Code
PCH Paging Channel
PhCH Physical Channel
PRACH Physical Random Access Channel
RACH Random Access Channel
RSC Recursive Systematic Convolutional Coder
RV Redundancy Version
RX Receive
SCH Synchronisation Channel
SF Spreading Factor
SFN System Frame Number
SIR Signal-to-Interference Ratio
SNR Signal to Noise Ratio
TF Transport Format
TFC Transport Format Combination
TFCI Transport Format Combination Indicator
TPC Transmit Power Control
TrCH Transport Channel
TTI Transmission Time Interval
TX Transmit UL Uplink (Reverse link)
RAN WG1 Radio access network Working Group 1 (Physical layer)
CR Change Request
HI HS-DSCH Indicator
HSDPA High Speed Downlink Packet Access
MCS (Modulation and Coding Scheme)

Note that the relevant documents regarding HSDPA are maintained by 3GPP, the third generation partnership project, Address: ETSI, Mobile Competence Centre, 650, route des Lucioles, 06921 Sophia-Antipolis Cedex, web-site www.3gpp.org.

The invention claimed is:

1. A method for rate matching a number of input bits in a time interval to a fixed total number of output bits in the time interval, the method comprising:
   providing that the input bits consist of a set of at least two different bit classes, each of the different bit classes having a certain number of bits in the time interval; and
   performing the rate matching in two rate matching stages;
   wherein a first rate matching stage punctures bits of a selection from the set of different bit classes to establish a proportion between the number of bits of the different classes;
   wherein a second rate matching stage repeats bits of all the different bit classes such that the proportion is at least approximately maintained after the second rate matching stage and the fixed total number of output bits consisting of bits of the different bit classes is achieved;
   wherein the set of different bit classes includes at least a systematic bit class with systematic bit carrying payload and at least one parity bit class with parity bits carrying checksum information; and
   wherein the proportion is maintained in the second rate matching stage by choosing $$N_{t,sys} = \left\lfloor N_{sys} \cdot \frac{N_{data}}{N_{sys} + N_{p1} + N_{p2}} \right\rfloor,$$

$$N_{t,p1} = \left\lfloor \frac{N_{data} - N_{t,sys}}{2} \right\rfloor \text{ and}$$

$$N_{t,p2} = \left\lceil \frac{N_{data} - N_{t,sys}}{2} \right\rceil$$

where $N_{data}$ denotes the fixed total number of output bits, $N_{t,sys}$ is the number of output bits of the systematic bits $N_{sys}$, $N_{t,p1}$ is the number of output bits of a first class of parity bits $N_{p1}$ and $N_{t,p2}$ is the number of output bits of a second class of parity bits $N_{p2}$.

2. The method according to claim 1, wherein the selection from the set of different bit classes which is operated onto at the first rate matching stage includes at least one parity bit class.

3. The method according to claim 1, wherein a number of bits of at least one bit class is reduced in the second rate matching stage to a next integer value and a number of at least another bit class is increased to a next integer value such that the fixed total number of output bits is achieved.

4. A method for rate matching a number of input bits in a time interval to a fixed total number of output bits in the time interval, the method comprising:
   providing that the input bits consist of a set of at least two different bit classes, each of the different bit classes having a certain number of bits in the time interval; and
   performing the rate matching in two rate matching stages;
   wherein a first rate matching stage punctures bits of a selection from the set of different bit classes to establish a proportion between the number of bits of the different classes;
   wherein a second rate matching stage repeats bits of all the different bit classes such that the proportion is at least approximately maintained after the second rate matching stage and the fixed total number of output bits consisting of bits of the different bit classes is achieved; and
   wherein the set of different bit classes includes at least a systematic bit class with systematic bit carrying payload and at least one parity bit class with parity bits carrying checksum information; and, wherein the proportion is maintained by choosing $$N_{t,sys} = \left\lfloor N_{sys} \cdot \frac{N_{data}}{N_{sys} + 2N_{p2}} \right\rfloor,$$

where $N_{data}$ denotes the fixed total number of output bits, $N_{t,sys}$ is the number of output bits of the systematic bits $N_{sys}$, and $N_{t,p2}$ is the number of output bits of a class of parity bits $N_{p2}$.

5. The method according to claim 4, wherein the selection from the set of different bit classes which is operated onto at the first rate matching stage includes at least one parity bit class.

6. The method according to claim 4, wherein a number of bits of at least one bit class is reduced in the second rate matching stage to a next integer value and a number of at least another bit class is increased to a next integer value such that the fixed total number of output bits is achieved.

7. The method according to the claim 4, wherein:
   different groups of bits are selected that each form a redundancy version;
   the selection is based on a value of an initial error variable $e_{ini}$, which is used in the rate matching algorithm with different values; and
   depending on the value of the initial error variable $e_{ini}$, the puncturing or repetition is performed on different subsets of bits of a bit class.

8. A method for rate matching a number of input bits in a time interval to a fixed total number of output bits in the time interval, the method comprising:
   providing that the input bits consist of a set of at least two different bit classes, each of the different bit classes having a certain number of bits in the time interval; and
   performing the rate matching in two rate matching stages;
   wherein a first rate matching stage punctures bits of a selection from the set of different bit classes to establish a proportion between the number of bits of the different classes;
   wherein a second rate matching stage repeats bits of all the different bit classes such that the proportion is at least approximately maintained after the second rate matching stage and the fixed total number of output bits consisting of bits of the different bit classes is achieved;
   wherein the set of different bit classes includes at least a systematic bit class with systematic bit carrying payload and at least one parity bit class with parity bits carrying checksum information; and wherein three bit classes are used, the three bit classes comprising two parity bit classes and one systematic bit class, with equal puncturing and repetition rates being obtained by calculating the number of output bits of the systematic bits $N_{t,sys}$, of the first parity bit class $N_{t,p1}$ and of the second parity bits class $N_{t,p2}$ by $$N_{t,sys} = \left\lfloor N_{sys} \cdot \frac{N_{data}}{N_{sys} + 2N_{p1}} \right\rfloor,$$

$$N_{t,p1} = \left\lfloor \frac{N_{data} - N_{t,sys}}{2} \right\rfloor, \text{ and}$$

$$N_{t,p2} = \left\lceil \frac{N_{data} - N_{t,sys}}{2} \right\rceil$$

where $N_{sys}$, $N_{p1}$ and $N_{p2}$ are the number of input bits for the corresponding classes, respectively, and $N_{data}$ denotes the fixed total number of output bits.

9. The method according to claim 8, wherein the selection from the set of different bit classes which is operated onto at the first rate matching stage includes at least one parity bit class.

10. The method according to claim 8, wherein a number of bits of at least one bit class is reduced in the second rate matching stage to a next integer value and a number of at least another bit class is increased to a next integer value such that the fixed total number of output bits is achieved.

11. A method for determining a rate matching scheme for application in a rate matching method for rate matching a number of input bits in a time interval to a fixed total number of output bits in the time interval, the method comprising:

providing that the input bits consist of a set of at least two different bit classes, each of the different bit classes having a certain number of bits in the time interval;

performing the rate matching in two rate matching stages, wherein a first rate matching stage punctures bits of a selection from a set of different bit classes to establish a proportion between the number of bits of the different classes, and wherein a second rate matching stage repeats bits of all the different bit classes such that the proportion is at least approximately maintained after the second rate matching stage and the fixed total number of output bits consisting of bits of the different bit classes is achieved, wherein a second rate matching stage repeats bits of all the different bit classes such that the proportion is at least approximately maintained after the second rate matching stage and the fixed total number of output bits consisting of bits of the different bit classes is achieved, wherein the proportion is maintained by choosing $$N_{t,sys} = \left\lfloor N_{sys} \cdot \frac{N_{data}}{N_{sys} + 2N_{p2}} \right\rfloor,$$

where $N_{data}$ denotes the fixed total number of output bits, $N_{t,sys}$ is the number of output bits of the systematic bits $N_{sys}$, and $N_{t,p2}$ is the number of output bits of a class of parity bits $N_{p2}$;

selecting different groups of bits that each form a redundancy version;

forming a redundancy version in dependence of an initial error variable parameter $e_{ini}$;

describing each redundancy version by at least one first redundancy version parameter r or a second redundancy version parameter s; and calculating $e_{ini}$ as $$e_{ini}(r) = \{[X_i - (r \cdot e_{plus}/r_{max}) - 1] \bmod e_{plus}\} + 1 \text{ for puncturing, and}$$

$$e_{ini}(r) = \{[X_i - ((s+2 \cdot r) \cdot e_{plus}/(2 \cdot r_{max})) - 1] \bmod e_{plus}\} + 1 \text{ for repetition,}$$

wherein $X_i$ is the number of input bits, $e_{plus}$ is an error increment variable which is used after each puncturing operation, and $r_{max}$ is a maximum number of redundancy versions.

12. The method according to claim 11, wherein the method is based on an integer representation of real-valued formulas $$e_{ini}(r) = \{[X_i - (r \cdot e_{plus}/r_{max}) - 1] \bmod e_{plus}\} + 1 \text{ for puncturing, and}$$

$$e_{ini}(r) = \{[X_i - ((s+2 \cdot r) \cdot e_{plus}/(2 \cdot r_{max})) - 1] \bmod e_{plus}\} + 1 \text{ for repetition.}$$

13. The method according to claim 11, wherein expressions $r^* e_{plus}/r_{max}$ for puncturing and $(s+2r)^* e_{plus}/(2r_{max})$ for repetition are rounded downwards to a next integer number, yielding formulas $$e_{ini}(r) = [(X_i - \lfloor r \cdot e_{plus}/r_{max} \rfloor - 1) \bmod e_{plus}] + 1 \text{ for puncturing, and}$$

$$e_{ini}(r) = (X_i - \lfloor (s+2 \cdot r) \cdot e_{plus}/(2 \cdot r_{max}) \rfloor - 1) \bmod e_{plus} + 1 \text{ for repetition.}$$

14. The method according to claim 11, wherein the calculation of $e_{ini}$ is performed in at least two calculation steps, with a fractional part of each calculation product not being used for the subsequent calculation step.

15. The method according to claim 14, wherein application of puncturing is repeating of a single bit.

16. A method for determining a rate matching scheme for application in a rate matching method for rate matching a number of input bits in a time interval to a fixed total number of output bits in the time interval, the method comprising:

providing that the input bits consist of a set of at least two different bit classes, each of the different bit classes having a certain number of bits in the time interval;

performing the rate matching in two rate matching stages, wherein a first rate matching stage punctures bits of a selection from a set of different bit classes to establish a proportion between the number of bits of the different classes, and wherein the proportion is at least approximately maintained after the second rate matching state by selecting $$N_{t,sys} = \left\lfloor N_{sys} \cdot \frac{N_{data}}{N_{sys} + N_{p1} + N_{p2}} \right\rfloor,$$

$$N_{t,p1} + \left\lfloor \frac{N_{data} - N_{t,sys}}{2} \right\rfloor \text{ and } N_{t,p2} = \left\lceil \frac{N_{data} - N_{t,sys}}{2} \right\rceil,$$

where $N_{data}$ denotes the fixed total number of output bits, $N_{t,sys}$ is the number of output bits of the systematic bits $N_{sys}$, $N_{t,p1}$ is the number of output bits of a first class of parity bits $N_{p1}$ and $N_{t,p2}$ is the number of output bits of a second class of parity bits $N_{p2}$;

selecting different groups of bits that each form a redundancy version;

forming a redundancy version in dependence of an initial error variable parameter $e_{ini}$;

describing each redundancy version by at least one first redundancy version parameter r or a second redundancy version parameter s; and calculating $e_{ini}$ as $e_{ini}(r) = \{[X_i - (r \cdot e_{plus}/r_{max}) - 1] \mod e_{plus}\} + 1$ for puncturing, and $e_{ini}(r) = \{[X_i((s+2 \cdot r) \cdot e_{plus}/(2 \cdot r_{max})) - 1] \mod e_{plus}\} + 1$ for repetition, wherein $X_i$ is the number of input bits, $e_{plus}$ is an error increment variable which is used after each puncturing operation, and $r_{max}$ is a maximum number of redundancy versions.

17. A method for determining a rate matching scheme for application in a rate matching method for rate matching a number of input bits in a time interval to a fixed total number of output bits in the time interval, the method comprising:

providing that the input bits consist of a set of at least two different bit classes, each of the different bit classes having a certain number of bits in the time interval;

performing the rate matching in two rate matching stages, wherein a first rate matching stage punctures bits of a selection from a set of different bit classes to establish a proportion between the number of bits of the different classes, and wherein a second rate matching stage repeats bits of all the different bit classes such that the proportion is at least approximately maintained after the second rate matching stage and the fixed total number of output bits consisting of bits of the different bit classes is achieved, selecting different groups of bits that each form a redundancy version;

forming a redundancy version in dependence of an initial error variable parameter $e_{ini}$;

describing each redundancy version by at least one first redundancy version parameter r or a second redundancy version parameter s; and calculating $e_{ini}$ as $e_{ini}(r) = \{[X_i - (r \cdot e_{plus}/r_{max}) - 1] \mod e_{plus}\} + 1$ for puncturing, and $e_{ini}(r) = \{[X_i - ((s+2 \cdot r) \cdot e_{plus}/(2 \cdot r_{max})) - 1] \mod e_{plus}\} + 1$ for repetition, wherein $X_i$ is the number of input bits, $e_{plus}$ is an error increment variable which is used after each puncturing operation, and $r_{max}$ is a maximum number of redundancy versions, and wherein three bit classes are used, the three bit classes comprising two parity bit classes and one systematic bit class, with equal puncturing and repetition rates being obtained by calculating the number of output bits of the systematic bits $N_{t,sys}$, of the first parity bit class $N_{t,p1}$ and of the second parity bits class $N_{t,p2}$ by $$N_{t,sys} = \left\lfloor N_{sys} \cdot \frac{N_{data}}{N_{sys} + 2N_{p1}} \right\rfloor,$$

$$N_{t,p1} = \left\lfloor \frac{N_{data} - N_{t,sys}}{2} \right\rfloor, \text{ and}$$

$$N_{t,p2} = \left\lceil \frac{N_{data} - N_{t,sys}}{2} \right\rceil$$

where $N_{sys}$, $N_{p1}$ and $N_{p2}$ are the number of input bits for the corresponding classes, respectively, and $N_{data}$ denotes the fixed total number of output bits.

* * * * *